W. A. UNDERHILL AND C. C. AVERY.
WAGON TRAIN.
APPLICATION FILED SEPT. 15, 1915.
1,336,665.
Patented Apr. 13, 1920.
2 SHEETS—SHEET 1.
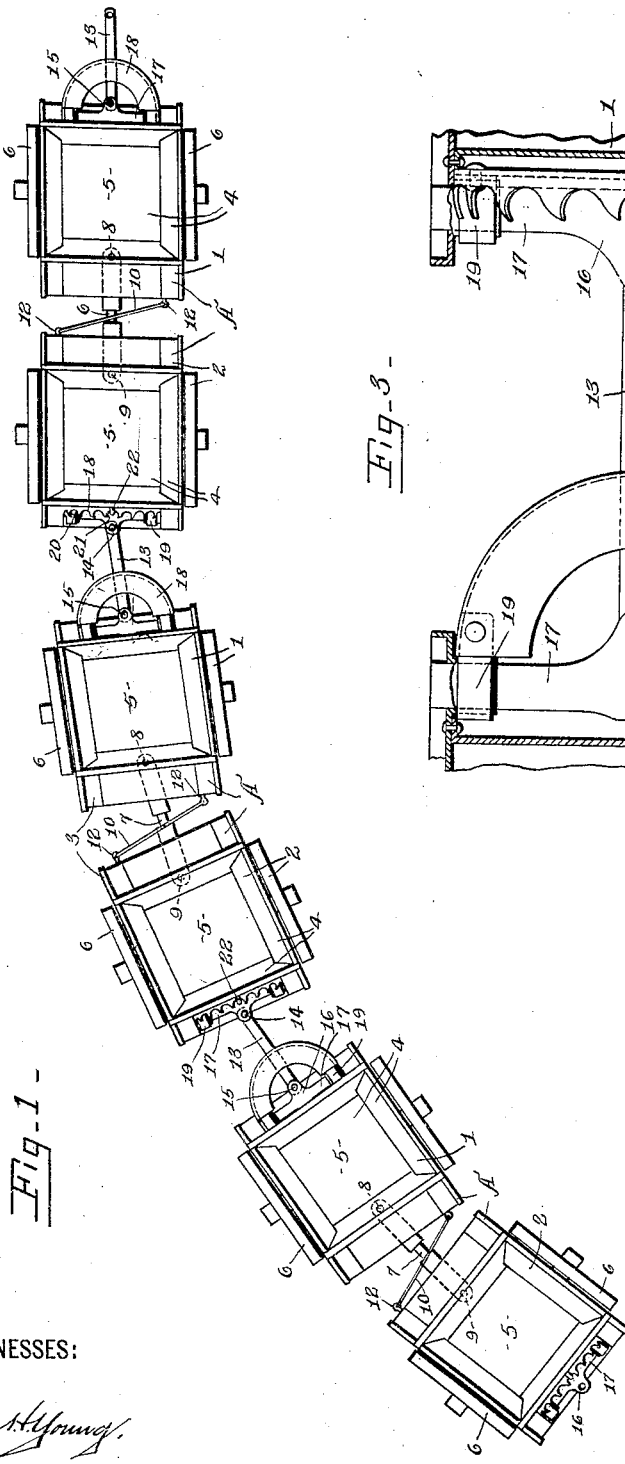
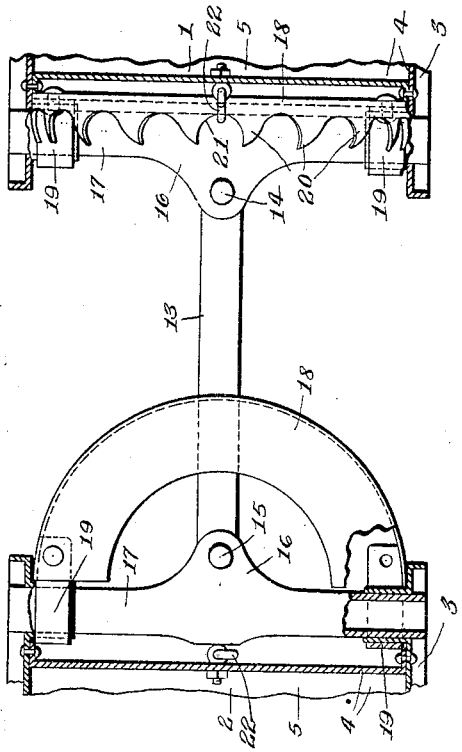
WITNESSES:
Chas H. Young
INVENTORS.
Walter A. Underhill
Courtney C. Avery
BY
Parsons & Bodell
ATTORNEYS

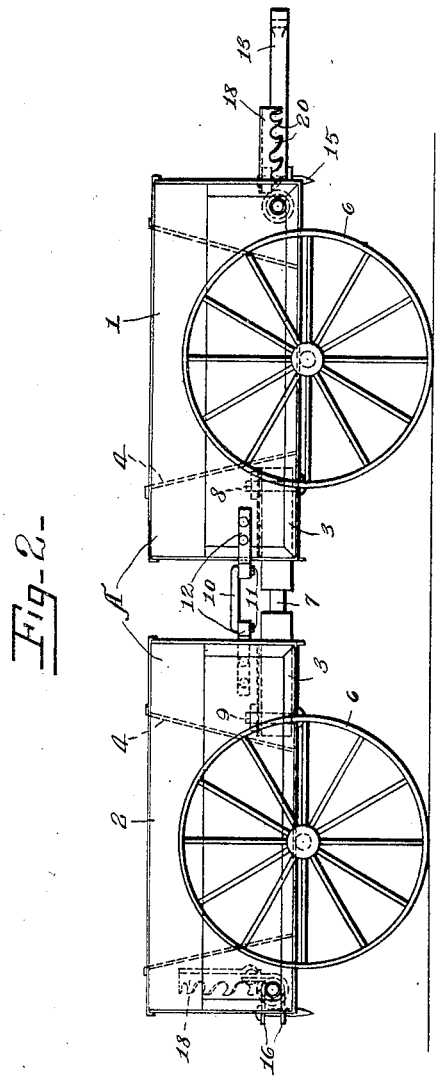

UNITED STATES PATENT OFFICE.

WALTER A. UNDERHILL AND COURTNEY C. AVERY, OF AUBURN, NEW YORK, ASSIGNORS TO THE EAGLE WAGON WORKS, OF AUBURN, NEW YORK, A CORPORATION OF NEW YORK.

WAGON-TRAIN.

1,336,665.      Specification of Letters Patent.      Patented Apr. 13, 1920.

Application filed September 15, 1915. Serial No. 50,761.

*To all whom it may concern:*

Be it known that we, WALTER A. UNDERHILL and COURTNEY C. AVERY, citizens of the United States, and residents of Auburn, in the county of Cayuga and State of New York, have invented a certain new and useful Wagon-Train, of which the following is a specification.

This invention has for its object a wagon train having means by which the wagons will trail properly when either a pushing or pulling force is applied to either end of the train, which means is particularly simple in construction and highly efficient and durable in use; and the invention consists in the novel combinations and constructions hereinafter set forth and claimed.

In describing this invention, reference is had to the accompanying drawings, in which like characters designate corresponding parts in all the views.

Figure 1 is a top plan of a wagon train embodying our invention.

Fig. 2 is a side elevation of one of the composite wagons of the train.

Fig. 3 is a plan view of the coupling means between two wagons.

This wagon train comprises composite wagons, each composed of a pair of two-wheeled carts, means coupling the carts and pivoted to the opposing ends thereof, means also connecting the carts by which the sidewise turning movement of one cart is transmitted to the other cart so that the carts will track, and means coupling the composite wagons comprising a bar pivoted to the opposing ends of the composite wagons, and means for holding the bar from pivotal movement relatively to either wagon, the latter means being movable into and out of operative position, and when in operative position permitting the bar to shift from either side of a central position into a central position.

1 and 2 designate the carts of each composite wagon A, these carts being here shown as including a frame 3 which supports hopper bodies or boxes 4, having bottoms 5 which open or dump, as will be understood by those skilled in the art. The wheels 6 of each cart are mounted on axles, the axial line of which extends crosswise of the hopper and as here shown extends directly below the same.

The means coupling each pair of carts 1, 2 includes a bar 7 pivoted at 8, 9 respectively to the frames 3 of the carts 1, 2, near the opposing ends of the carts, that is, in this form of my invention, in front of the box or hopper of one of said carts, and in the rear of the hopper or box of the other of said carts. In other words, the bar 7 is pivoted to the framing of the carts outside of the hoppers or boxes thereof, so that the pushing or pulling force is transmitted through the frames 3 of the carts to the axles and not through bars or other means directly connecting the axles. When the bottoms 5 are dropped, or the load otherwise dumped, the load will not be obstructed by the bars.

Any sidewise turning movement of either cart is transmitted to the other in order that the carts will track, by means of a rod 10 extending obliquely crosswise of the line of draft and the bar 7, and connected at one end to one cart and at its other end to the other cart. This rod 10 as seen in Fig. 2 is formed with downturned ends 11 which enter suitable eyes 12 on the opposing ends of the carts.

The means for coupling the composite wagons comprises a bar 13 pivoted at 14, 15 to opposing ends of the frames of the wagons centrally thereof, the bars 13 being here shown as pivoted to bearings 16 mounted on shafts 17 extending crosswise of the opposing ends of the composite wagons, each shaft being mounted at its ends in the sides of the contiguous cart of the wagon.

The means for holding the bar 13 from pivotal movement relatively to one cart comprises a member 18 which is here shown as arc-shape in general form and as having bearings 19 rotatably mounted on the shaft 17 and as having ratchet teeth 20 which engage and permit the bar to ratchet from either side of a central position into a central position where it seats into a non-ratcheting socket 21 at the center of the member 18. The rotatable mounting or hinging of the member 18 permits it to move during the ratcheting action and also to be shifted upwardly out of operative position against the end of the contiguous cart, where it is held in any suitable manner by a catch 22.

The bars 23 are pivoted to opposing ends of the wagons outside of the boxes or hoppers 3 for the same reason that the bars 6 are so located.

Heretofore, in wagon trains, the coupling bars have been located underneath the boxes, and hence are in the path of the dumping load. By our arrangement, the load has a free passage to the ground after it leaves the hopper.

In operation, as the wagon train is being pulled to the right Fig. 1, the members 18 on the front carts are moved into operative position and those of the rear carts swung out of operative position. Thus the rear wagon will trail in the tracks of the next wagon in front; and the means coupling the carts will also steer the carts around corners. When the power is transferred from one end of the train to the other, the holding members 18 that are down, are moved up out of engagement with the bars 13, and the members 18 that were previously up, are swung down into engagement with the bars 13. When this operation takes place, the carts will probably not be in position so that the bars 13 are arranged centrally with the latter members 18, but as the wagon train begins to move and straighten out, the bars 13 will swing toward central position and when they reach central position will ratchet into the non-ratcheting sockets 21.

This wagon train is particularly advantageous in that it provides a simple and efficient arrangement of means for coupling the composite wagons of the train and for coupling the carts which compose the wagons, which means do not interfere with the dumping of the load.

What we claim is:—

1. A wagon train comprising composite wagons, each wagon being composed of a pair of two-wheeled carts, a bar pivoted to the opposing ends of the carts and means connecting the opposing ends of the carts extending from the front end of one cart on one side of the bar to the rear end of the other cart on the opposite side of the bar, and a coupling connecting the opposing ends of the composite wagons, said coupling comprising a bar pivoted to the opposing ends of the wagons, and means for holding the wagon coupling bar from pivotal movement relatively to one of the wagons, substantially as and for the purpose described.

2. In combination, a dump wagon train comprising composite wagons, each wagon being composed of a pair of two-wheeled carts having hoppers, the lines of axes of the wheels of the carts extending crosswise of the hoppers, a bar coupling each pair of carts, the bar being pivoted to one cart in front of the hopper and to the companion cart in the rear of its hopper, means for transmitting lateral turning movement of either cart to the other, and means coupling the composite wagons of the train, comprising a bar pivoted to the opposing ends of the wagons centrally thereof, and a member associated with each wagon for holding the wagon coupling bar from pivotal movement, said member being shiftable into and out of engagement with said wagon coupling bar and operating to permit the bar to move from either side of a central position into a central position, substantially as and for the purpose described.

In testimony whereof, we have hereunto signed our names at Auburn, in the county of Cayuga, in the State of New York, this 16th day of July, 1915.

WALTER A. UNDERHILL.
COURTNEY C. AVERY.

Witnesses:
H. T. KEELER,
CHAS. H. YOUNG.